United States Patent [19]

Niemann

[11] Patent Number: 4,848,535

[45] Date of Patent: Jul. 18, 1989

[54] ASH CONVEYER

[76] Inventor: Gary O. Niemann, 3204 E. Lake Hartridge Dr., N.W., Winter Haven, Fla. 33880

[21] Appl. No.: 865,185

[22] Filed: May 20, 1986

[51] Int. Cl.⁴ .............................................. B65G 65/34
[52] U.S. Cl. ................................ 198/550.12; 198/746
[58] Field of Search ............. 198/701, 550.11, 550.12, 198/740, 746, 743; 414/325, 409, 648, 393, 133

[56] References Cited

U.S. PATENT DOCUMENTS

| | | | |
|---|---|---|---|
| 720,143 | 2/1903 | Hildreth | 198/746 X |
| 1,458,241 | 6/1923 | Otterson | 414/648 X |
| 2,751,061 | 6/1956 | Nickerson | 198/746 X |
| 2,828,041 | 3/1958 | Leonard | 414/648 X |
| 3,298,552 | 1/1967 | Kuhner et al. | 414/648 |
| 3,774,754 | 11/1973 | Hedlund | 198/746 |
| 4,190,147 | 2/1980 | Hansson | 198/746 |
| 4,320,008 | 3/1982 | Kokubo | 198/746 X |

FOREIGN PATENT DOCUMENTS

| | | | |
|---|---|---|---|
| 84111 | 3/1895 | Fed. Rep. of Germany | 198/746 |
| 821776 | 11/1951 | Fed. Rep. of Germany | 198/746 |
| 109902 | 10/1917 | France | 198/746 |
| 1399776 | 4/1965 | France | 198/746 |

Primary Examiner—Robert J. Spar
Assistant Examiner—D. Glenn Dayoan
Attorney, Agent, or Firm—Berman, Aisenberg & Platt

[57] ABSTRACT

A conveyer for moving elements along a pan is disclosed. The conveyer uses a pivotally-mounted scoop carried by a trolley which rides on a track running beside the pan. When moving in the forward direction, the scoop is pivotally rotated to engage the bottom of the pan and move the articles along the pan. When moving in the reverse direction, the scoop is rotated so that it does not engage the bottom of the pan to allow it to move rearwardly whereupon another forward motion occurs. At the upper end of the pan, the track moves at an increased angle to cause the scoop to pivot into a position whereby the articles are more efficiently pushed over the edge of the pan.

11 Claims, 2 Drawing Sheets

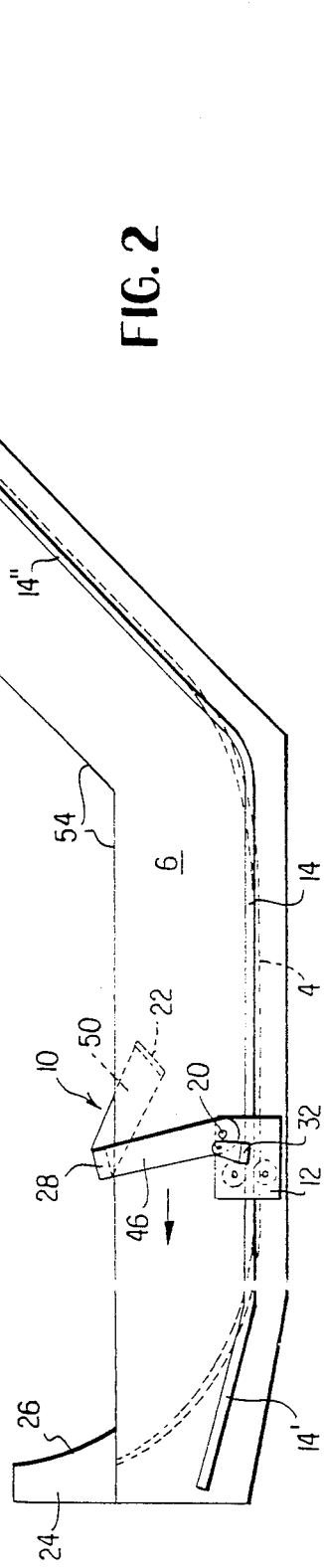
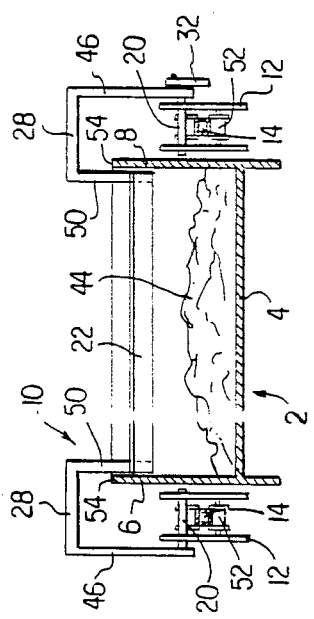

ASH CONVEYER

TECHNICAL FIELD

This invention relates to the art of conveyers, particularly those used for conveying materials such as ashes.

BACKGROUND ART

In furnaces which produce ashes, it is necessary to remove the ashes from the furnace for disposal. While it is possible to allow the ashes to accumulate and then remove them periodically, it is known to provide a continuous conveyer-type element for continual removal of ashes.

Because the ashes are typically hot and caustic, prior devices which engage the ashes have suffered various maintenance difficulties.

SUMMARY OF THE INVENTION

In accordance with the invention, a unique conveyer system is provided for efficiently moving objects, such as furnace ashes, from a location adjacent a furnace to a dumping location. A pan is used to contain the ashes and extends from the location adjacent the furnace to the dumping location. Preferably, the pan is water-tight and includes a horizontal segment followed by upwardly directed segment to lift the ashes to a desired level. The pan is water-tight so that the horizontal section can contain water to cool the ashes sufficiently to substantially reduce the fire danger of the ashes.

A scoop moves along the pan to move the ashes along the pan. The scoop reciprocates, and when moving in a forward direction it is in a rotational position which causes it to engage the ashes, while when moving in the reverse direction it is in a rotational position in which it does not engage ashes. A selected rotational position is maintained during forward and reverse directions by the relative location of the center of gravity of the scoop and the pivot point. Means are provided at opposite ends of the pan for rotating the scoop into one of the two rotational orientations.

The scoop is carried by a trolley which rides on a track, and a chain engages the trolley to power it along the track. The chain, associated idler pulleys, the track, and the trolley are all located on the exterior of the pan and are thus completely removed from contact with the ashes.

It is an object of this invention to provide a conveyer for ashes.

Another object of this invention is to provide a conveyer for ashes wherein ashes are received in a pan and moved by a scoop along the pan.

Yet another object of this invention is to provide a conveyer system for hot ashes wherein a scoop which is carried by a trolley moves along a pan and wherein the scoop and associated driving mechanisms are on the exterior of the pan.

BRIEF DESCRIPTION OF THE DRAWINGS

FIG. 2 is a schematic side view of the preferred embodiment of the invention showing how the scoop is pivoted at the upper end.

FIG. 3 is a cross-section taken along line 3—3 of FIG. 1.

DETAILED DESCRIPTION OF THE PREFERRED EMBODIMENT

Figure 1:
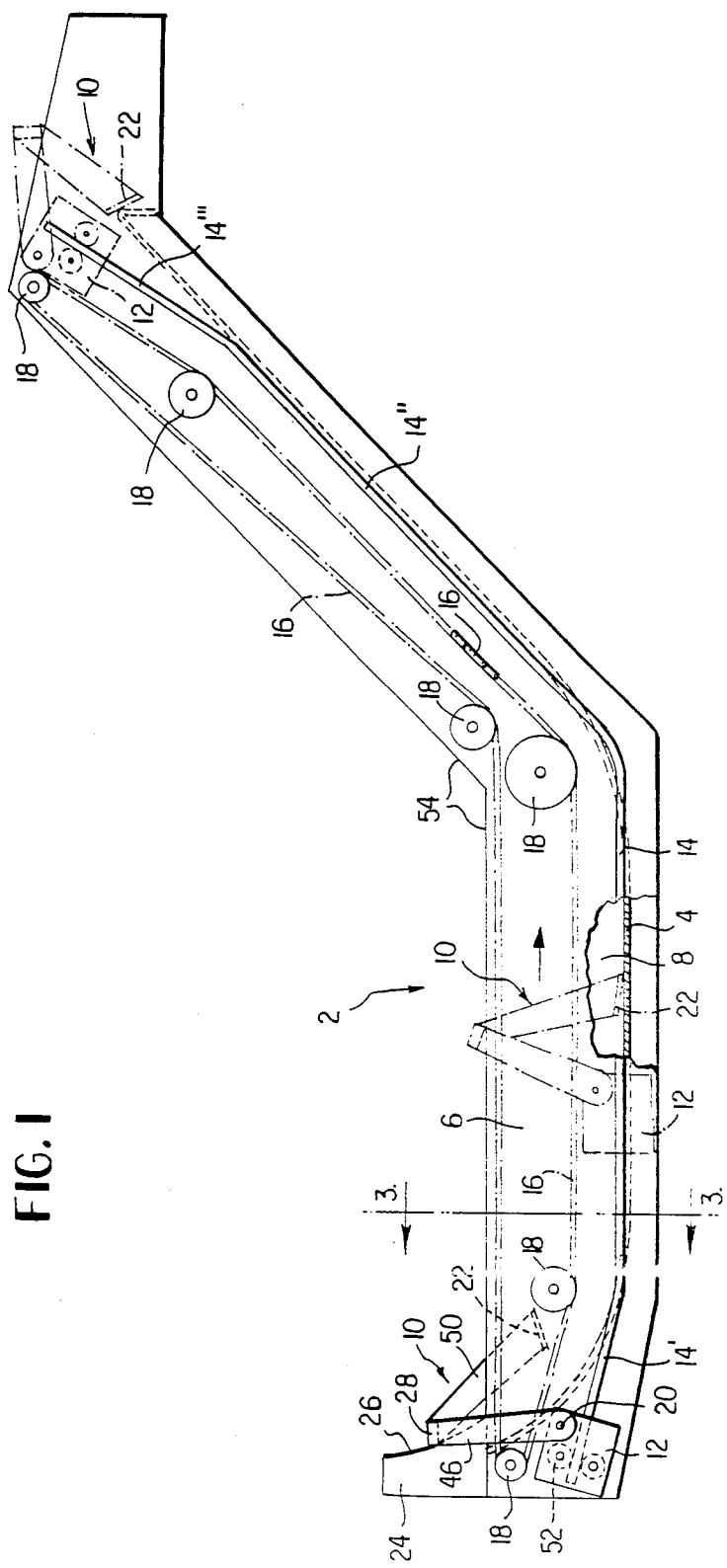
FIG. 1 is a side view of a preferred embodiment of the invention.

FIG. 1 is a side view of a preferred form of invention. A pan 2 has a generally horizontal section and an upwardly extending section. The pan has a bottom surface 4 and upstanding sides 6, and 8 (see FIG. 3).

In operation, the horizontal section of the pan will be placed beneath a discharge opening of a furnace (not shown) so that ashes may fall directly into the horizontal portion of the pan.

A scoop 10 is mounted to a trolley 12 for movement along the pan to carry ashes from the horizontal portion of the pan, up the upwardly extending portion of the pan, over the upper end of the pan and into a container, or the like (not shown). The trolley 12 preferably comprises two trolleys as shown in FIG. 3, located on respective opposite sides of the pan. Trolleys 12 ride on tracks 14 located on opposite sides of the pan and having four preferred sections. A first section 14 is essentially horizontal and parallel to a horizontal portion of pan 2. A section 14' toward the left end of the pan as seen in FIG. 1 rises upwardly slightly, a section 14" extends essentially parallel to the upwardly extending portion of pan 2, and section 14''' extends at a greater angle to the horizontal at the terminal end of section 14".

Trolleys 12 are moved along track 14 by a chain 16 driven by a motor (not shown) and guided by a plurality of idler pulleys 18.

A preferred form of the scoop 10 is shown at the left end of FIG. 1 and is pivotally attached to trolley 12 at hinge 20. Only one scoop 10 is provided for each pan, and one such scoop is shown in solid lines. Other positions of the scoop for purposes of describing the operation of the invention are shown in phantom lines in FIGS. 1 and 2. Trolleys 12 are driven forwardly and backwardly by the control motor, and elements such as limit switches may be used to detect the presence of a trolley at respective ends of the pan to direct the control motor to drive the trolley in the opposite direction. When the trolley is driven in the forward direction, i.e. from left to right in FIG. 1, scoop 10 will pivot downwardly such that end 22 scrapes along the bottom 4 of pan 2 to carry ashes along the horizontal part, up the upwardly extending part and over the end of the pan. When the trolleys are driven in the reverse direction, i.e. from right to left of FIG. 1, scoop 10 will pivot rearwardly as shown at the left end of FIG. 1 so that end 22 does not scrape bottom 4.

Bumper 24 is placed at the left end of the pan as shown in FIG. 1 and has a curved surface 26 which engages crotch 28 of scoop 10 as trolley 12 is being driven to the left to cause scoop 10 to pivot in a clockwise direction such that end 22 again engages bottom 4. Then, scoop 10 and trolleys 12 are ready to begin a movement to the right of FIG. 1 to push ashes up along the pan and over the upper, righthand end of the pan.

The upper right end of the pan shown in FIG. 1 shows scoop 10 at the upper extreme part of the pan. In this location, the scoop 10 has been pivoted to dump ashes over the end of the pan.

FIG. 2 is a schematic view of the apparatus shown in FIG. 1 and illustrates how scoop 10 or 10' is manipulated at the upper end of pan 2.

With reference to the upper righthand portion of FIG. 2, there is shown scoop 10 in four different orientations. In the uppermost orientation, scoop 10 is tilted in a clockwise direction to dump ashes. This clockwise rotation occurs because track 14''' moves upwardly (see the upper righthand portion of FIG. 1) as the trolleys 12 move from left to right of FIG. 2. Beginning at the orientation shown in the upper righthand portions of FIG. 2, trolley 12 begins to move toward the left. As it does so, scoop 10 begins to rotate in a counterclockwise direction because track 14''' moves downwardly so that tip 22 essentially pivots about upper edge 30 of pan 2. Attached to scoop 10 is a counterweight 32 which, for convenience, is shown only in two of the several views of scoop 10 at the upper righthand end of the pan. Counterweight 32 causes the center of gravity to be located at approximately the location indicated at 34. It will be appreciated that when scoop 10 is tilted forwardly such that tip 22 engages bottom 4 of pan 2, the center of gravity is on the right side of pivot point 20. This maintains contact between tip 22 and bottom 4 during movement of the scoop from left to right in FIGS. 1 and 2.

When the trolley 12 is drven from right to left in FIG. 2 counterweight 32 engages trip arm 36 which causes the scoop to rotate in a counterclockwise direction so that the center of gravity 34 is then located to the left of hinge 20. This lifts tip 22 from bottom 4 to allow the scoop to be moved to the left of FIGS. 1 and 2 without engaging the bottom of the pan to prevent moving ashes in the undesired direction. When the crotch 28 engages bumper 24, it again rotates so that center of gravity 34 is to the right of hinge 20 and tip 22 engages bottom 4 to be in the proper orientation for scooping ashes.

The trip arm 36 is pivotally mounted to pan 2 at 38 and itself includes, preferably, a counterweight 40 to cause it to maintain the proper orientations. A stop 42 prevents trip arm 36 from pivoting in a counterclockwise direction when engaged by counterweight 32 on a reverse run of scoop 10, but allows rotation of trip arm 36 when engaged by counterweight 32 when scoop 10 is moving in a forward direction. In otherwords, trip arm 36 merely pivots out the way when the scoop is moving in a forward direction but remains an obstruction causing rotation of scoop 10 when driven in the reverse direction.

It will be appreciated that the above-described elements cause tip 22 to move along bottom 4 when scoop 10 is being driven from left to right, but that tip 22 rides above bottom 4 when scoop 10 is being driven from right to left.

Center of gravity 34 is preferably located far enough to the right of hinge 20 such that if tip 22 engages a small obstruction which tends to rotate scoop 10 in a counterclockwise direction by a small amount during forward movement of the scoop, center of gravity 34 will remain to the right of hinge 20 to maintain contact between tip 22 and bottom 4 after the obstruction has been passed. But, even if an obstruction large enough to pivot scoop 10 rearwardly is encountered, the only defect would be to drive the scoop to the end of the pan without moving ashes whereupon it would restored to the proper orientation when driven in the reverse direction and encountering bumper 24.

The drive control has not been shown and will typically be a part of the furnace. Thus, the furnace will discharge ashes into the horizontal portion of pan 2 and a control mechanism will cause a driver motor to move trolleys 12 along track 14 at pre-selected intervals.

FIG. 3 is a cross-section taken along line 3—3 of FIG. 1. Ashes 44 are shown in pan 2 and engaged by end 22 of scoop 10. Scoop 10 comprises upwardly extending arms 46, horizontal crotch portions 28 and downwardly extending arms 50. Hinge pins 20 engage trolleys 12, which are illustrated as including wheels 52 riding on track 14. It will be appreciated that numerous other constructions for the trolleys are possible.

As noted above, when scoop 10 is driven to the right of FIG. 1, tip 22 engages bottom 4. When driven in the opposite direction, crotch 28 preferably engages upper edge 54 of pan 2 and rides along the upper edge as it moves rearwardly. Other constructions are possible, such as a roller bearing-type stop mounted on scoop 10 for engaging upper edge 54 to limit counterclockwise rotation of the scoop.

It will be appreciated that pan 2 can be sealed to allow a liquid such as water to be placed in the pan to cool the ashes. The only parts which engage the ashes are the inside surface of pan 2, downwardly directly arms 50 and end 22. Other parts such as chain 16, idlers 18, track 14, and trolleys 12 are located exteriorly of pan 2 and are thus not subject to degradation caused by contact with the hot ashes.

Modifications of the invention within the scope of the appended claims will be apparent to those who are skilled in the art.

I claim:

1. Apparatus for moving material comprising pan means forming a channel for holding said material, scoop means for engaging said material, trolley means pivotally mounting said scoop means for rotation about an axis, track means extending in a direction generally parallel to said pan means for carrying said trolley means along said pan means, and means for driving said trolley along said track, wherein at least a portion of said track means extends in a direction transverse to the direction in which an adjacent portion of said pan means extends, and wherein said portion of said track means is at a dumping end of said pan means and said portion of said track means allows said scoop means to rotate to dump said material.

2. Apparatus according to claim 1 wherein said pan means comprises water-tight means.

3. Apparatus according to claim 1 wherein said scoop means has a weight distribution with respect to said axis such that the center of gravity of said scoop means lies on one side of said axis when said scoop is in a first position and on an opposite side of said axis when said scoop means is in a second position whereby said scoop means remains in one of said first or second positions until moved by a trip means 4. Apparatus according to claim 3, further comprising said trip means for rotating said scoop means between said first position wherein said scoop means extends into said channel and said second position wherein said scoop means lies outside of said channel.

5. Apparatus according to claim 4 comprising second trip means comprising a bumper means having a curved surface for engaging said scoop and causing said scoop to rotate as said scoop moves toward said bumper means.

6. Apparatus according to claim 4 wherein said trip means is a pivotally mounted element.

7. Apparatus for moving material comprising pan means having a sidewall forming a channel for holding said material, track means adjacent said pan means, trolley means for moving along said track means, and scoop means pivotally supported by said trolley means at a pivotal connection means wherein said track means, said trolley means, and said pivotal connection means are remote from said channel and below a top edge of said pan means, and wherein said scoop means extends upwardly from said pivotal connection means, over the top of said sidewall, into said channel, whereby said track, said trolley, and said pivotal connection means are remote from said material.

8. Apparatus according to claim 7 wherein said pan means further comprises means to render said pan means water tight.

9. Apparatus according to claim 7 wherein said scoop comprises an end which engages a bottom of said pan means, wherein said end is longitudinally ahead of said pivotal connection when said scoop is in an operative position in which it engages said material.

10. Apparatus according to claim 9 wherein the center of gravity of said scoop means is longitudinally ahead of said pivotal connection when said scoop is in said operative position.

11. Apparatus according to claim 10 wherein said trolley means comprises first and second trolleys on opposite sides of said pan means.

* * * * *